Jan. 14, 1930. W. T. FIELD 1,743,338
MEANS FOR INSERTING VALVES
Filed Feb. 5, 1929 3 Sheets-Sheet 1
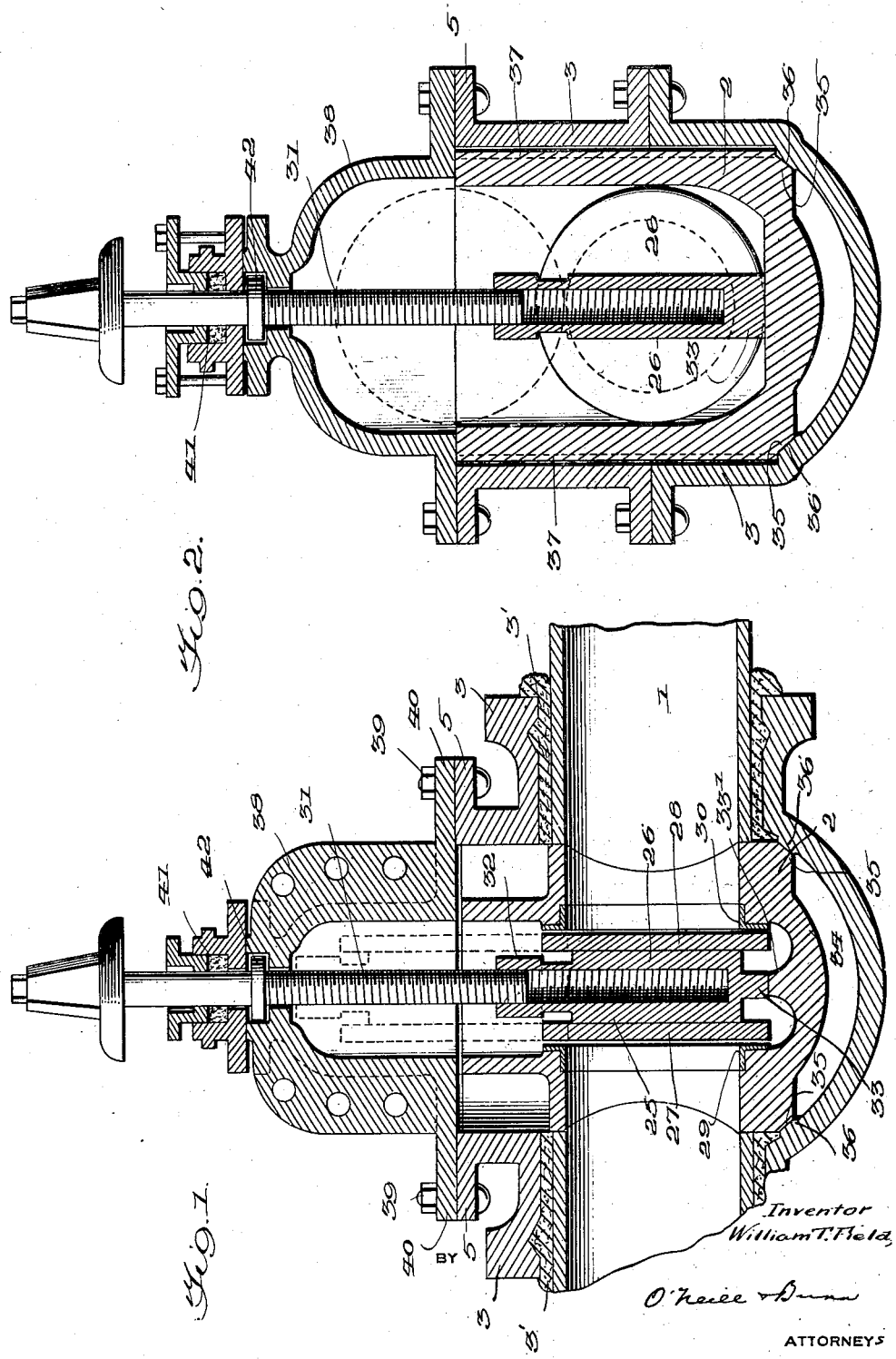
Inventor
William T. Field,
BY O'Neill & Dunn
ATTORNEYS

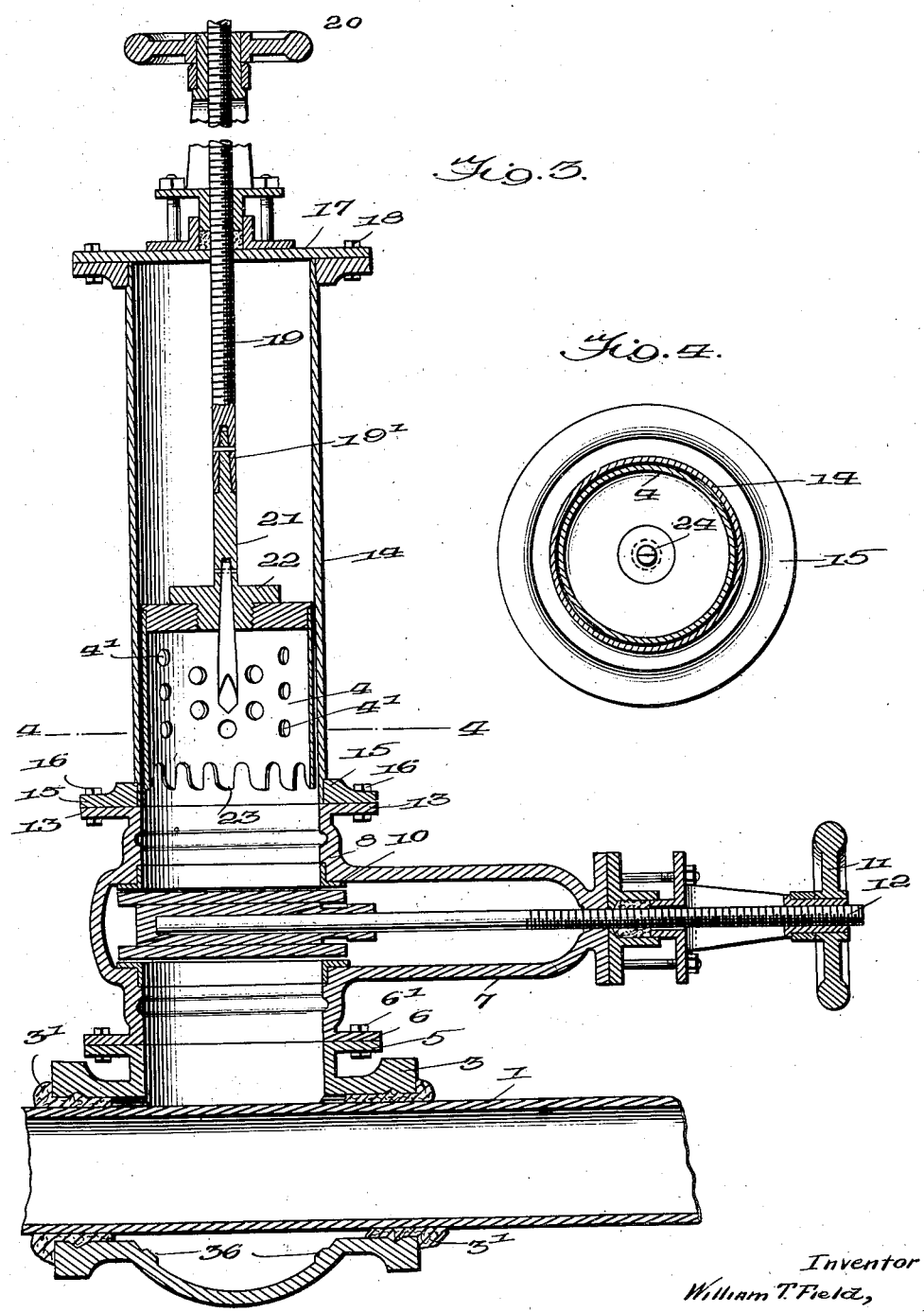

Jan. 14, 1930.  W. T. FIELD  1,743,338
MEANS FOR INSERTING VALVES
Filed Feb. 5, 1929  3 Sheets-Sheet 3
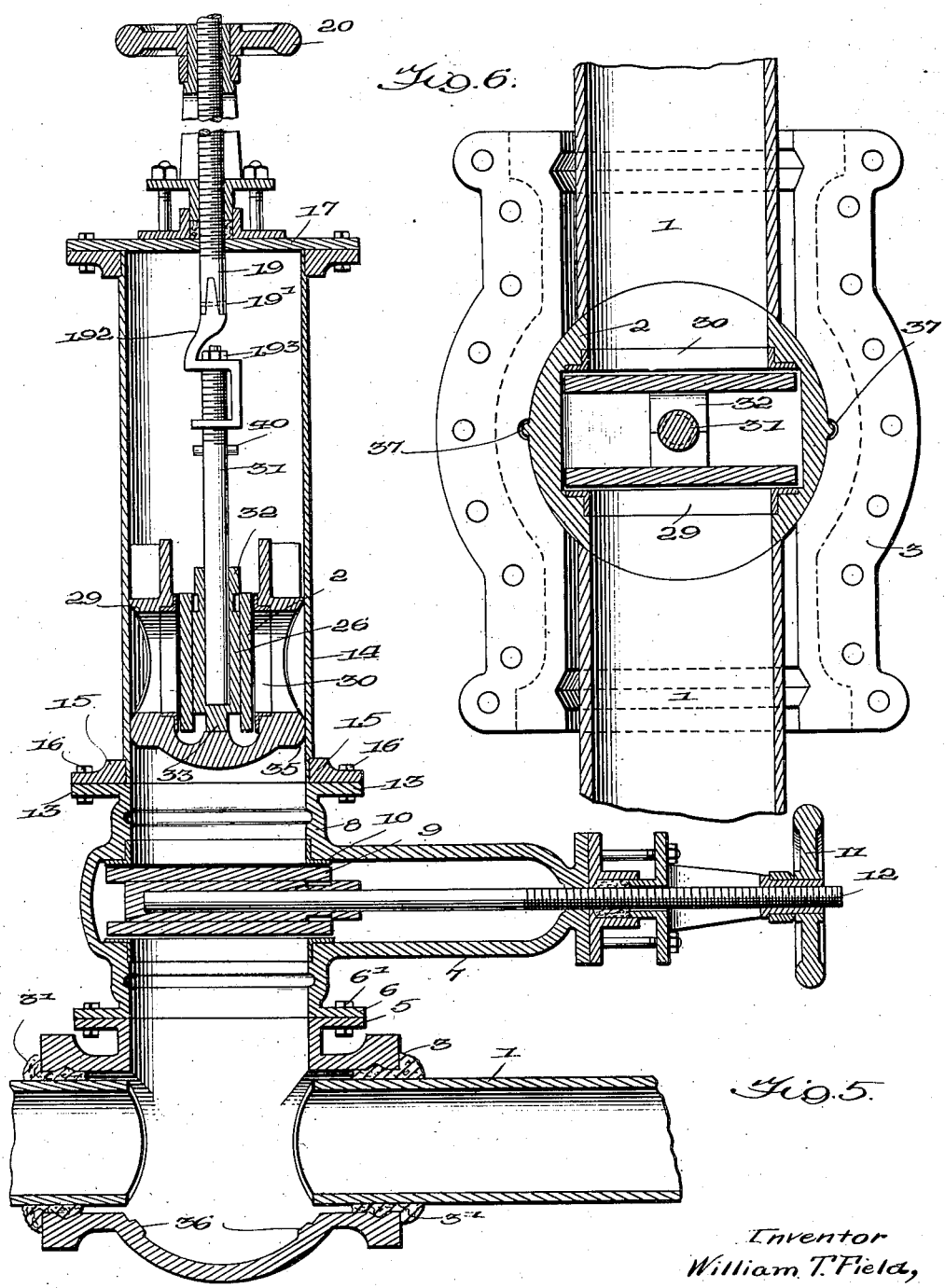
Inventor
William T. Field,
BY
O'Neill & Burn
ATTORNEYS Patented Jan. 14, 1930

1,743,338

UNITED STATES PATENT OFFICE

WILLIAM T. FIELD, OF WATERTOWN, NEW YORK

MEANS FOR INSERTING VALVES

Application filed February 5, 1929. Serial No. 337,642.

This invention relates to methods and means for installing valves in fluid conduits, such as water mains or the like, more specifically designed to install the valve without the necessity of shutting off the flow of liquid or gas through the conduit.

It is frequently necessary or desirable that a supplementary valve be installed in a liquid circulatory system such as gas or water mains, and it is extremely desirable that such operation should not necessitate a discontinuance of the passage of gas or liquid through the main or conduit into which the valve is to be installed, this being particularly true when the conduit is the main artery of a city lighting, or a water supply system.

The primary object of the invention therefore, is the provision of methods and means which may be practiced and utilized most easily in installing a supplemental valve in a supply conduit, without any decrease of pressure in said conduit.

A very important feature of the present invention resides in the provision of two-part sleeve, or outer valve casing, which is permanently associated with the main line at the beginning of the operation of inserting a valve into the latter, together with the use of an interior valve unit comprising an inner casing carrying seats and valves insertible into the outer casing. This interior valve unit is detachably connected with the outer casing and such arrangement provides for the replacement of a worn valve or the repair of a previously inserted valve, without interfering with the normal flow of fluid in the line.

Other objects of the invention will be made apparent in the following specifications, when read in connection with the drawings forming a part thereof.

In said drawings:—

Fig. 1 is a horizontal section taken through a valve which has been installed in a main, in the practice of my invention.

Fig. 2 is a vertical section looking longitudinally of the main.

Fig. 3 is a horizontal section showing the means for removing a section of the pipe to provide an opening therein into which a valve is inserted.

Fig. 4 is a section on the line 4—4 of Fig. 3.

Fig. 5 is a vertical section through the complete assembly, showing the valve ready for insertion into the opening in the main, and the means for seating the valve, and, Fig. 6 is a horizontal section through the valve as installed in Fig. 1.

Now referring specifically to the drawings, in which like reference characters indicate like parts throughout the several views, in Fig. 3 the numeral 1 indicates a main into which it is desired to insert a valve 2, such as shown in Fig. 5, and without any material variance of the pressure in said main. In the practice of my invention, that portion of the main in which the valve is to be installed is surrounded by a split sleeve or outer valve casing 3, provided on its upper flat surface with a circular opening of a diameter sufficient to permit the insertion of a cutter tool 4, and of the valve 2, as desired. This casing 3 is permanently connected to the pipe line 1 at the beginning of the operation of inserting a valve in the main line, by sealing the various joints around the line in any well known manner. In this structure, the joints are shown as lead packed as indicated by numeral 3'. The opening in the casing 3 is surrounded by a horizontally extending, peripheral flange 5, adapted to receive a similar flange 6, formed on a valve casing 7, having a tubular body portion 8 open at its top and bottom, and of the same dimensions and in alignment with the opening in the casing 3, the flanges 5 and 6 being connected by bolts 6'. A disk or gate valve 9 is reciprocably mounted in the casing 7, for movement to and away from its seat 10, to cut off or establish communication between the interior of the sleeve 3, and the body portion 8 of the valve casing 7, as will be understood. The reciprocations of the valve 9 are caused by rotation of the hand wheel 11, mounted on the outer end of a threaded stem 12 extending through the suitably packed end of the body 7, and connected to the valve 9, the end of the body 7 being threaded to co-operate with the stem 12 so that rotation of the latter will advance or retract the valve, the latter being guided in its reciprocations by properly formed tongue and groove constructions if desired, but, since the particular formation of said valve constitutes no part of this invention, further detailed description thereof is deemed unnecessary.

The opening at the top of the body portion 8 of the casing 7, is also provided with a flange 13 surrounding the opening, similar to the flange 5, and an open-ended cylinder 14 is seated on the upper surface of the portion 8. A ring 15 surrounds the lower portion of and is connected with the cylinder 14 in any suitable manner, and bolts 16 passing through the flanges 13 and the ring 15, securely retain the cylinder 14 in position.

It is to be noted that, as clearly shown in Fig. 3, the structure hereinbefore described provides a passage extending vertically through the top of the casing 3, and, when the valve 9 is retracted into its casing 7, said passage extends upwardly through the body 8, and into the cylinder 14, the interior diameters of the openings in the casing 3 and the body 8, being identical with or possibly greater, than that of the cylinder 14. The top of the cylinder 14 is closed by a head 17 detachably secured thereto by bolts 18. The top of the head 17 is apertured to receive a screw-threaded shaft 19, adapted for rotation by a wheel 20, which may obviously be manually operated, or driven by power, the shaft 19 being extended through a screw-threaded block, so that rotation of the wheel 20 may reciprocate the shaft 19, as will be understood.

Detachably secured to the lower portion of the shaft 19, by means of a pin and socket connection 19', within the cylinder 14, is a carrier 21, provided on its lower face with plug 22 which is screwed into the upper portion of the cylindrically-formed cutting tool 4, the latter being provided on its lower surface with cutter teeth 23. Extending upwardly through the center of the plug 22, and secured thereto, is a pick-up gimlet or tap and drill 24, screw-threaded at its lower end, for a purpose to be hereinafter referred to.

It will also be noted that the cutter member 4 is provided with a series of apertures therethrough as shown at 4', the purpose thereof being to permit the fluid in the main to pass through the cutter while the same is operating to remove a section of pipe and thereby prevent the cutter from acting as a cut-off valve when it extends entirely across the pipe line.

In the operation of installing a valve in the main 1, the parts are first assembled as shown in Fig. 3, and the valve 9 drawn backwardly within its casing 7, the sleeve 3 of course being permanently positioned around that portion of the main from which a section is to be cut. The wheel 20, or other suitable instrumentality, is then actuated to rotate the shaft 19 so as to move the cutter 4 downwardly, continued operation of said cutter severing a section of the main. During the cutting operation the gimlet 24 will obviously pierce the top layer of the section of the main to be removed, the threads on the gimlet forming and entering grooves in the adjacent edges of the aperture so cut, so that, when the cutter 4 is withdrawn from the casing 3, the section cut from the main will be lifted out through the portion 8 of the valve casing 7.

At this time the valve 9 is pressed to its seat 10 by manipulation of the wheel 11, liquid from the main 1 filling the casing 3, and the space below the valve 9, but having no access to the cylinder 14 above said valve. The top 17 of the cylinder 14 is then removed, and the shaft 19, the cutter 4, and the cut section of the main taken out of said cylinder.

The valve 2 which is to be inserted into the pipe line 1 and within the outer valve casing 3, is a unit composed of a casing carrying valve seats and a gate valve of any well known structure. The gate valve, as illustrated best in Figs. 1 and 5, is here shown as composed of two wedge-shaped members 25 and 26, connected with disks 27 and 28 respectively, said disks being respectively adapted to engage seats 29 and 30. The inclined faces of the wedges are in contact, and an operating stem 31 is extended through the top portion 32 of the wedge 26, and through the inclined faces of both wedges, terminating against the floor of a pocket formed in the inclined face of the wedge 25, adapted to seat on a raised shoulder 33' formed centrally on the bottom 34 of the valve body.

The lower face of the valve body, on each side, carries beveled stop portions 35, and the upper surface of the extreme lower, downwardly-curved portion of the casing 3, is provided with upstanding lugs 36, the outer beveled faces of which are adapted to register with and receive the beveled stop portions 35 carried by the valve, when the latter is forced downwardly into the aperture left by the removal of the cut-out portion of the main 1. The structure as described, and as best illustrated in Fig. 1, permits the bottom 34 of the valve body to drop below the lower surface of the main, and align the passage through the valve with the interior of the main. After the cutter 4 has been disconnected from the shaft 19 by removing the pin 19', the valve unit above referred to is attached to a shaft 19 by means of a socket connector element $19^2$ which is connected with the shaft 19 by means of the socket and pin coupling 19'. This element carries a screw-threaded socket $19^3$ adapted to be threaded on to the end of the valve stem 31. The parts are then assembled as shown in Fig. 5, and the valve 9 retracted, thereby affording communication between the outer valve casing 3 and the interior of the chamber 14. In forcing the valve to its operative position, the shaft 19 is rotated or dropped by the hand wheel 20, or by suitable ratchet levers, or other instrumentalities. The downward pressure imparted by the shaft 19 forces the valve 2 downwardly through the portion 8, and into the casing 3, until the stop portions 35 engage the lugs 36, it being of course understood that the valve body is so fabricated, with respect to the size of the cutter 4, that the former may be tightly forced onto its seats 36, 36, with a wedging fit securely retaining it in operative position. During the downward movement of the valve 2, it is guided to its seat by tongues 37, 37, carried by the valve, and riding in grooves formed in the casing 3, said grooves preferably being also provided in the portion 8 of the valve body 7. It is to be understood however, that various forms of guiding means may be used to cause the valve to be properly aligned in the casing 3, and the invention is not restricted by the use of the tongue and groove shown and described.

After the unit 2 has been placed in position in casing 3, the gate valves 27 and 28 are engaged with the seats 29 and 30, thereby effectively cutting off the fluid supply for a short period sufficient to permit the cylinder or chamber 14 and valve casing to be removed and the application of the split hood or bonnet structure 38. The bonnet structure is of usual construction and is clamped to the flange 5 of the casing 3 by bolts 39 which pass through said flange 5 and a flange 40 carried by the bonnet. Of course the joints of this valve bonnet are suitably packed as shown at 41 but this feature forms no part of the present invention.

The completed valve installation is shown in Fig. 1, and it will be noted that, by the use of a valve structure 2 which is removable as a unit, repairs or replacements of valve parts can readily be made without difficulty. For instance, should a valve require new seats or the replacement of the gate valve, it is necessary only to remove the bonnet 38 and connect the chambers 8 and 14 as shown in Fig. 5, whereupon the entire unit 2 may be withdrawn by rotation of the stem 31, swiveled at 42, and repaired or replaced as desired, without materially disturbing the use of the main.

Modifications of the structure herein disclosed may be suggested to those skilled in the art, but my invention covers all embodiments falling fairly within the scope of the appended claims.

What I claim is:—

1. A valve installing mechanism comprising a housing covering a portion of a main into which a valve is to be inserted, and provided with an opening therein, means for removing a section of said main, means for positioning said valve to fill the space left by the removed section of the main, and valve seats formed integral with said housing adapted to receive registering abutments integrally carried by said valve.

2. A valve installing mechanism comprising a housing covering a portion of a main into which a valve is to be inserted, and provided with an opening therein, means for removing a section of said main, means for detachably positioning said valve to fill the space left by the removed section of the main, and valve seats formed integral with said housing adapted to receive registering abutments integrally carried by said valve.

3. Apparatus for inserting a valve into a cut-out portion of a main, including a split housing surrounding said portion and provided on its top with an opening permitting access of said valve, said housing carrying a downward extension projecting below the plane of the main, said extension being provided with integrally formed seats adapted to receive registering abutments carried by the body of the valve.

4. Apparatus of the class described, comprising in combination with a main having an opening therein, a split housing surrounding the main and provided with a passage in its top portion, a complete valve unit adapted to be passed through said opening, and cooperating means integrally carried by the valve unit and housing whereby to so detachably position the valve that the passage therethrough is aligned with the passage through the main.

5. Apparatus of the class described, comprising in combination with a main provided with an opening therein, a split housing surrounding said main and provided with a passage in its top portion, the lower wall of said housing depending below the plane of the main, a complete valve unit adapted to be passed through said opening, integrally-formed, aligned abutments carried by the lower wall of said housing, and aligned abutments projecting downwardly from the bottom of said valve and adapted for contact with the abutments carried by said lower wall of the housing.

6. In combination, with a main having an opening extending transversely therethrough, a housing surrounding the main and a valve positioned in said opening, of abutments carried on the top face of the lower portion of said housing, registering abutments carried on the bottom of said valve and adapted for contact with the abutments on said housing, and means adapted for operation to press the abutments on the valve more tightly against the abutments on the housing.

In testimony whereof I affix my signature.

WILLIAM T. FIELD.